US009541036B2

(12) United States Patent
Gautier et al.

(10) Patent No.: US 9,541,036 B2
(45) Date of Patent: Jan. 10, 2017

(54) FLUID FLOW VALVE, ESPECIALLY FOR RECIRCULATED EXHAUST GAS

(71) Applicant: Valeo Systemes de Controle Moteur, Cergy Saint Christophe (FR)

(72) Inventors: Sylvain Gautier, Ennery (FR); Yoann Lemarchand, Fremecourt (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 36 days.

(21) Appl. No.: 14/427,689

(22) PCT Filed: Sep. 13, 2013

(86) PCT No.: PCT/FR2013/052108
§ 371 (c)(1),
(2) Date: Mar. 12, 2015

(87) PCT Pub. No.: WO2014/041317
PCT Pub. Date: Mar. 20, 2014

(65) Prior Publication Data

US 2015/0240755 A1 Aug. 27, 2015

(30) Foreign Application Priority Data

Sep. 14, 2012 (FR) ..................................... 12 58656

(51) Int. Cl.
*F16K 5/06* (2006.01)
*F02M 25/07* (2006.01)
*F02F 1/24* (2006.01)

(52) U.S. Cl.
CPC ............ *F02M 25/0794* (2013.01); *F02F 1/24* (2013.01); *F02M 26/20* (2016.02); *F02M 26/67* (2016.02);
(Continued)

(58) Field of Classification Search
CPC .... F02M 25/0794; F02M 26/67; F02M 26/72; F02M 26/60; F02M 26/70; F02M 26/54; F02F 1/24
(Continued)

(56) References Cited

U.S. PATENT DOCUMENTS 1,950,911 A * 3/1934 Zahodiakin ............... F01L 1/28 123/79 C
2007/0144483 A1* 6/2007 Torii ....................... F02D 9/103 123/337
2013/0105009 A1* 5/2013 Oda .................. F01M 13/0011 137/517

FOREIGN PATENT DOCUMENTS

DE 10 2007 007087 A1 8/2008
EP 0 132 989 A2 2/1985
(Continued)

OTHER PUBLICATIONS

International Search Report issued in corresponding application No. PCT/FR2013/052108, mailed Oct. 22, 2013 (6 pages).

*Primary Examiner* — Marguerite McMahon
(74) *Attorney, Agent, or Firm* — Osha Liang LLP

(57) ABSTRACT

A fluid flow valve that includes a movable closure member and a body that includes a projecting part that receives the closure member. The body is designed to be attached to a support in such a way that the projecting part is introduced into a housing in the support. In addition, the body is designed to allow the valve to be secured to the support in a direction transverse to a longitudinal direction of extension of the projecting part. The invention is suitable for the recirculation of exhaust gases of motor vehicle engines.

19 Claims, 3 Drawing Sheets

Figure 1:
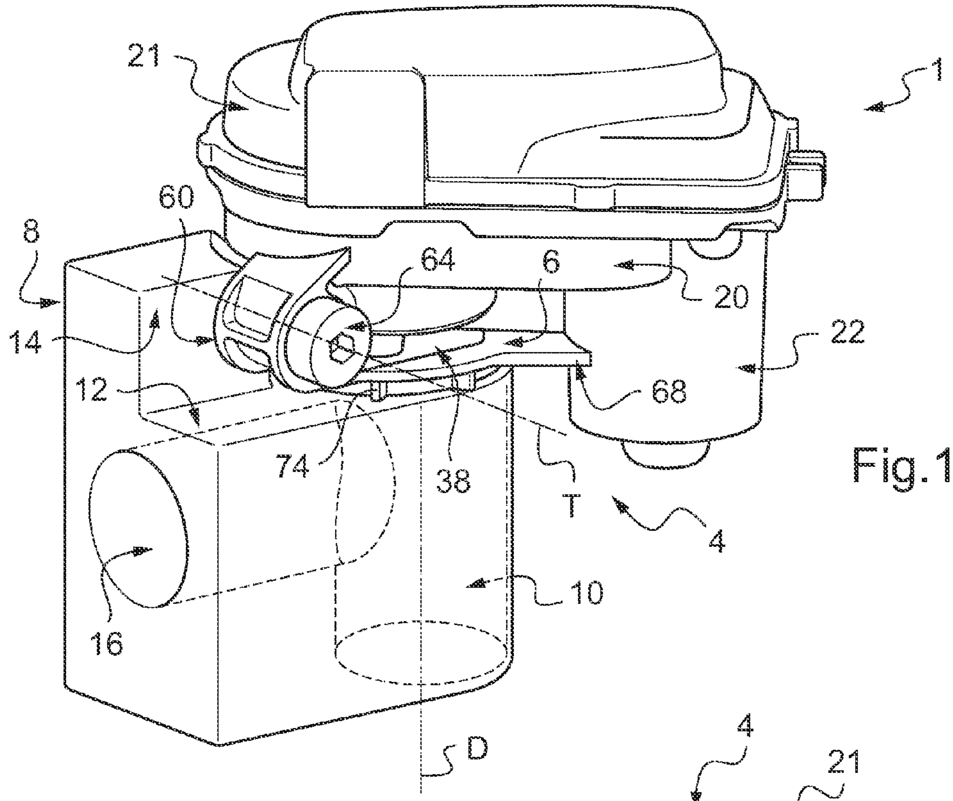

(52) U.S. Cl.
CPC .............. *F02M 26/72* (2016.02); *F02M 26/54* (2016.02); *F02M 26/70* (2016.02)

(58) Field of Classification Search
USPC .......................................... 123/568.18, 193.5
See application file for complete search history.

(56) References Cited

FOREIGN PATENT DOCUMENTS

| | | | |
|---|---|---|---|
| EP | 0 928 892 | A1 | 7/1999 |
| EP | 1 092 854 | A2 | 4/2001 |
| FR | 2 727 158 | A1 | 5/1996 |
| FR | 2 947 027 | A1 | 12/2010 |

* cited by examiner

FLUID FLOW VALVE, ESPECIALLY FOR RECIRCULATED EXHAUST GAS

The invention concerns a fluid flow valve, in particular for controlling a gas flow. It is used for example in the automotive sector. More particularly, the invention relates to a flow control valve for recirculated exhaust gas (EGR).

In general, an exhaust gas recirculation system of an internal combustion engine allows a reduction in the quantity of nitrous oxides present in the exhaust gases. Such systems comprise a valve allowing control of the gas flow which is taken from the engine exhaust in order to be introduced into the intake.

In this context, valves are known which comprise a moveable shutter allowing control of the recirculated exhaust gas flow, and a body comprising a protruding cylindrical part receiving said shutter. Said body is configured to be arranged on a support such that said protruding part is situated in a housing of said support which is shaped correspondingly to said protruding part.

Conventionally, the body is mounted on the support by screws oriented parallel to the longitudinal axis of said protruding part, said screws cooperating with passage openings arranged in the valve body, the axis of said openings being distributed angularly around said protruding part. The valve is fixed to its support by exerting a force in an axial direction. A simple flat seal, extending in a plane perpendicular to the axis of the housing, then suffices to ensure the desired tightness between said body and said support.

In view of this, because of the small space sometimes available below the hood, it is not always possible to position the passage openings on the valve so as to allow fixing of the valve in such an orientation. The valve would then have too great a radial dimension.

The invention proposes to remedy said drawbacks and to this end concerns a fluid flow valve comprising a mobile shutter and a body, comprising a protruding part receiving said shutter, said body being configured to be mounted on a support such that said protruding part is introduced into a housing of said support.

According to the invention, said body is also configured to allow fixing of said valve on said support in a direction transverse to a longitudinal extension direction of said protruding part. In this way a valve of reduced radial size is achieved. In fact relative to a valve with axial fixing, the fixing screws of which must necessarily lie radially outside the dimensions of the protruding part receiving the shutter, the choice of a fixing direction transverse to said longitudinal extension direction allows the valve to be fixed to its support in a limited radial space.

The valve may have a radial tightness between the protruding part and the support. "Radial" here is understood in particular as in opposition to "longitudinal".

At the same time, the use of a radial tightness, i.e. a tightness obtained by radial compression of a seal applied at said protruding part, provides a simple and effective solution for the tightness between the valve and its support.

According to various embodiments of the invention which may be combined or applied separately:

- said valve comprises a seal of the O-ring type, said protruding part and said seal being configured to provide said radial tightness,
- said protruding part comprises a lateral wall with a groove receiving said seal,
- said transverse direction is oriented in a plane substantially perpendicular to said longitudinal extension direction,

- said transverse direction is oriented tangentially relative to said protruding part,
- said valve also comprises fixing means allowing fixing of said body on said support in said transverse direction,
- said fixing means comprise an orifice arranged in said body, in particular in said protruding part, in said transverse direction,
- said protruding part comprises a proximal end and an opposing distal end, said valve being configured to allow introduction of said protruding part into said housing by said distal end,
- said protruding part comprises a first zone intended to be situated in the housing of the support, and a second zone intended to remain outside said housing of the support,
- said fixing means are situated at the level of said second zone and/or said proximal end,
- said body comprises a housing, in particular a housing receiving the kinematic transmission elements between a drive motor and the shutter, said housing forming a shoulder,
- said fixing means are situated between said shoulder on one side and, on the other side, said first zone and/or said distal end in the longitudinal extension direction,
- said orifice of the fixing means is oriented to allow fixing of said valve in a screwing direction allowing a screwing tool to avoid the shoulder,
- said orifice provided in said body in said transverse direction T is intended to contain a screw or nut, for example a lock nut,
- said body is configured to allow fixing of said valve projecting from said support,
- said body comprises one or more reinforcing ribs,
- said rib or ribs are oriented orthogonally to said axis of longitudinal extension,
- one of said ribs is formed by said shoulder and another of the ribs is formed remote from said shoulder in the longitudinal extension direction,
- said protruding part receiving said shutter comprises, in particular at the level of said second zone, radial projections intended in particular to form a spacer element between a rest surface of the support and said other rib,
- the shutter is mobile in translation in the longitudinal extension direction or in rotation about the longitudinal extension direction. According to a preferred embodiment, the shutter comprises an actuating rod and a valve head which rests on a valve seat formed by the distal end of said protruding part.

According to advantageous embodiments, the material of the seal is selected from an elastomer of FPM (fluorocarbonated), PTFE (polytetrafluoroethylene), more commonly known under its commercial name Teflon®, and peroxided FPM.

The invention furthermore concerns an assembly of a valve as described above and an engine cylinder head forming said support.

Figure 2:
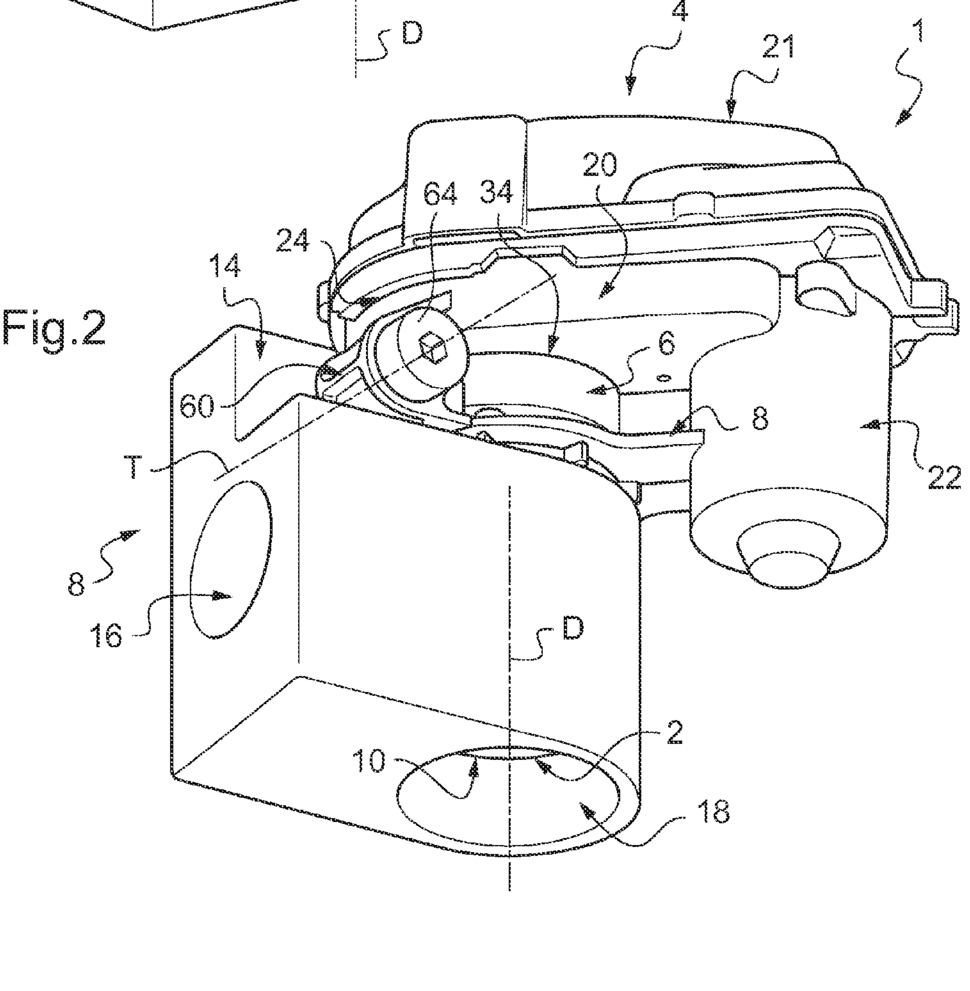
Figure 3:
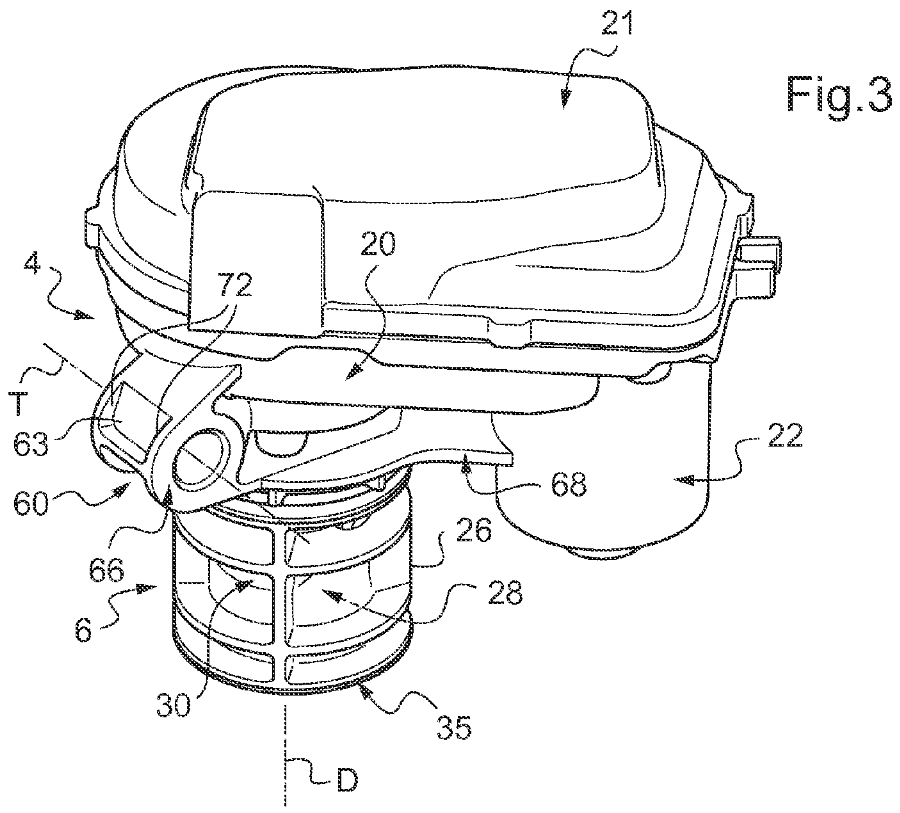
Figure 4:
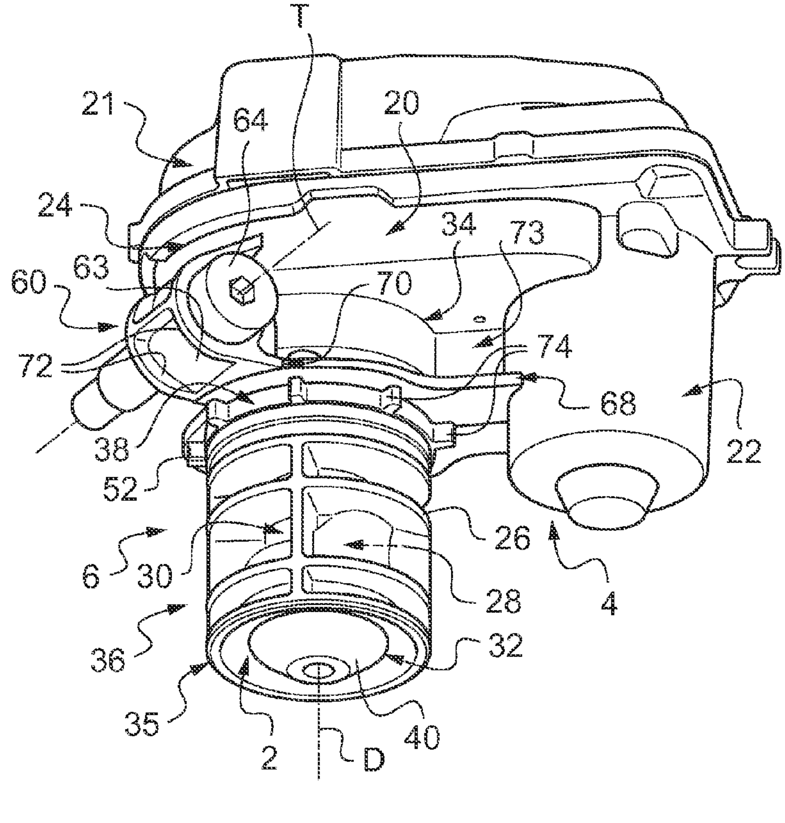
Figure 5:
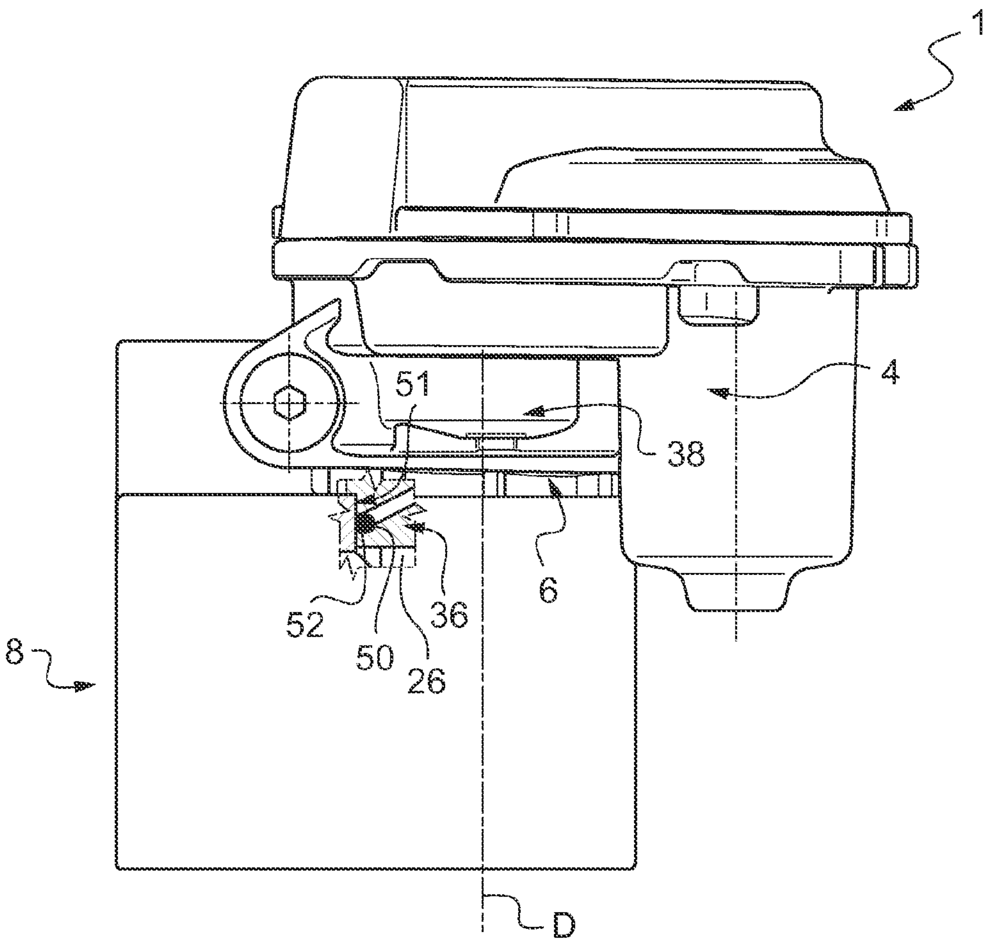

Further characteristics and advantages of the invention will appear from reading the description below which relates to detailed exemplary embodiments, with reference to the attached drawings on which:

FIGS. 1 and 2 illustrate in perspective, from two different angles, an exemplary embodiment of the valve according to the invention assembled on its support, the latter being depicted diagrammatically, FIGS. 3 and 4 illustrate in perspective, from two different angles, the valve in FIGS. 1 and 2 before assembly on its support, FIG. 5 illustrates in a front view the valve and the support of FIGS. 1 and 2, the support being partially broken away to show a detail of the valve, illustrated in a diametral section plane.

As illustrated on FIGS. 1 to 4, the invention concerns a fluid flow valve 1. This may be a gas flow control valve, in particular for recirculated exhaust gas for an internal combustion engine of a motor vehicle.

Said valve 1 comprises a moveable shutter 2 shown on FIGS. 2 and 4, and a body 4 comprising a protruding part 6 receiving said shutter 2. Said body 4 is configured to be mounted on a support 8 such that said protruding part 6 is introduced into a housing 10 of said support 8. FIG. 1 shows the interior of said support 8 diagrammatically, without said protruding part 6, so as to illustrate the positioning of said housing 10.

Said support 8 comprises for example a surface 12 for supporting said valve and a surface 14, here perpendicular, for fixing the valve. Said housing 10 is provided opening at the level of said support surface 12. Said support could also comprise a threaded opening (not visible), serving for fixing the valve on said support 8. Said threaded opening is here situated on said fixing face 14.

Said support 8 allows the circulation of said fluid. For this it comprises for example an inlet channel 16 and an outlet channel 18. Said inlet channel 16 is oriented in particular radially relative to a longitudinal extension direction of said housing 10. Said outlet channel 18 is for example situated in the axial extension of said housing 10.

Said support 8 is here illustrated in a particularly diagrammatic fashion. It may amongst others be a cylinder head of an internal combustion engine serving to propel the vehicle fitted with said valve.

Said body 4 is for example a casting, in particular of aluminum or aluminum alloy.

It comprises a base 20 from which said protruding part 6 holding the shutter 2 originates. Another protruding part 22, serving to house a motor (not visible) for driving said shutter 2, may also originate from said base 20.

Said base 20 forms a housing or closed chamber which contains kinematic transmission elements (not visible) transmitting the movement from a motor output shaft to the shutter 2. The kinematic transmission elements comprise for example a toothed wheel gear mechanism assembled in the known fashion. In this way the degree of opening of the shutter is controlled. Said housing is closed for example by a cover 21 of said valve, in particular made of plastic material.

Said base 20 may also form a shoulder 24 extending radially beyond the protruding part or parts 6, 22. Said shoulder 24 serves in particular for fixing said cover 21.

Said protruding part 6 receiving said shutter 2 extends in a longitudinal extension direction D intended to correspond with the longitudinal extension direction of the housing 10 of the support 8.

Said protruding part 6 receiving said shutter 2 comprises for example a wall 26 defining an inner cavity 28 in which said shutter 2 is mounted movably. Said wall 26 has an inlet 30 and an outlet 32 for the fluid, configured to lie opposite the inlet channel 16 and outlet channel 18 respectively of the support 8. In this way it allows circulation of the fluid from said inlet channel 6 to said outlet channel 18 through said inner cavity 28 when said shutter 2 is in the open position. Said protruding part 6 receiving said shutter 2 here has a ribbed configuration.

As shown more clearly in FIG. 4, said protruding part 6 receiving said shutter 2 may also comprise a proximal end 34 and an opposing distal end 35, said valve being configured to allow introduction of said protruding part 6 receiving said shutter 2 into said housing 10 of the support 8 by said distal end 35. It is noted here that said protruding part 6 receiving said shutter 2 is only partly situated in said housing 10 of the support 8. In this way it comprises a first zone 36 defining said distal end 35 and intended to be situated in the housing 10 of the support 8, and a second zone 38 defining said proximal end 34 and intended to remain outside said housing 10 of the support 8. Said proximal end is here situated close to said shoulder 24 of the base 20.

Said protruding part 6 receiving said shutter 2, more particularly its cavity 28, and the housing 10 of said support 8 are for example cylindrical, said longitudinal extension direction D of said protruding part 6 receiving said shutter 2 then being defined by the axis of the cylinder.

Said shutter 2 is configured to occupy different positions corresponding to different flow rates of said fluid, said positions ranging from a closed position (as shown) to a maximum flow position in which said shutter 10 has been raised in the extension direction D of said protruding part 6 receiving said shutter 2.

Said shutter 2 has an actuation axis intended to extend in the longitudinal direction extension D of said protruding part 6 receiving said shutter 2. More precisely, said shutter 2 here comprises a valve formed by a rod (not visible) and a closing head 40 mounted at the end of the rod. Said valve rod extends in said extension direction D to connect with said kinematic transmission elements at an opposite end of said rod.

The closing head 40 closes or opens the outlet 32 of said protruding part 6 receiving said shutter 2, in order to block or allow the circulation of fluid by cooperating with a valve seat formed by the distal end 35 of said protruding part 6 receiving said shutter 2. Said rod is for example movable in translation in said longitudinal extension direction D, said valve then comprising means (not visible) for converting the movement provided by said kinematic transmission elements—in this case a rotation—into a translation movement. Said means are housed for example at the level of said second zone 38 of said protruding part 6 receiving said shutter 2.

In one variant (not shown), the valve may be replaced by a butterfly valve, an actuating rod of the flap then being directly driven in rotation about its axis by the kinematic transmission elements.

According to the invention, said body 4 is also configured to allow fixing of said valve 1 to said support 8 in a direction T transverse to said longitudinal extension direction D of said protruding part 6 receiving said shutter 2. Said body 4 is again configured to allow a radial tightness between said protruding part 6 receiving said shutter 2 and said support 8. This gives a simple fixing solution, limiting the size of the valve while ensuring a satisfactory tightness.

As shown in detail on FIG. 5, said valve 1 comprises for example a seal 50 of the O-ring type. Said protruding part 6 receiving said shutter 2 and said O-ring 50 are configured to ensure said radial tightness. Said wall 26 of said protruding part 6 receiving said shutter 2 here comprises for this, on its lateral surface 51, a groove 52 receiving said O-ring 50. Said O-ring 50 and said groove 52 are dimensioned to allow compression of the seal on introduction of said protruding part 6 receiving said shutter 2 into said housing 8 of the support 6.

Said O-ring 50 and/or said groove 52 are situated at the level of said first zone 36 and close to said second zone 38 in said longitudinal extension direction D. In other words they are situated at the end of said first zone 36 opposite said distal end 35.

The O-ring 50 is for example made of material based on fluorocarbonated polymer FPM, in particular peroxided FPM and/or Teflon® (PTFE).

Referring again to FIGS. 1 to 4, we see that said transverse direction T is oriented for example in a plane substantially perpendicular to said longitudinal extension direction D. Also said transverse direction T is intended to be oriented tangentially relative to said protruding part 6 receiving said shutter 2, in particular tangentially to said second zone 38.

Said valve may also comprise fixing means 60 allowing fixing of said body 4 to said support 8 in said transverse direction T. In particular said means comprises an orifice 62 provided in said body, in said transverse direction T, and intended to receive a screw or nut 64, for example a lock nut. Said nut or screw 64 has not been shown in FIG. 3 for clearer depiction of said orifice 62 of said fixing means.

Said orifice 62 of the fixing means is formed for example in a sleeve 63, here originating radially from said second zone 38 and/or said base 20 of the body 4. At one of its ends, said sleeve defines a rest surface 66 for said screw or nut 64, and/or at the other of its ends a contact surface (not visible) intended to lie opposite the fixing surface 14 of the support 8, preferably flat on flat. Said sleeve 63 comprises ribs 72 formed orthogonally to said transverse direction T.

Said orifice 62 of the fixing means is intended to be situated in the extension of said threaded orifice provided in the support 8 for screwing of said screw or nut 64. It is noted that such an orifice 62, although alone, is sufficient to obtain satisfactory fixing of the valve 1 on its support 8.

Said orifice 62 of the fixing means is oriented to allow fixing of said valve in a screwing direction allowing a screwing tool to avoid the shoulder 24. In other words, as already mentioned in relation to the positioning and orientation of the transverse fixing direction T, said orifice 62 of the fixing means is situated for example tangentially relative to said protruding part 6 receiving said shutter 2, in particular tangentially to said second zone 38, and even more particularly in a plane orthogonal to said longitudinal extension direction D. It is positioned axially between said proximal end 34 and said first zone 36.

Said body 4 is here configured to allow fixing of said valve 1 projecting from said support 8. Said protruding part 6 receiving said shutter 2 may in particular have a greater mass than the other protruding part 22, in order to reduce the overhang.

To limit the effects of the overhang, said body 4 may also comprise one or more reinforcing ribs, in particular oriented orthogonally to said longitudinal extension axis D.

One of said ribs is formed by said shoulder 24, and another 68 of the ribs is formed remote from said shoulder 24 in the longitudinal extension direction. It connects here to an angular extremity 70 of the ribs 72 of said sleeve 63. A material fin 73, here orthogonal to said ribs 24, 68, may furthermore connect said protruding part 6 receiving said shutter 2 and said other protruding part 22.

Said protruding part 6 receiving said shutter 2 may also comprise, in particular at the level of said second zone 38, radial projections 74 intended to form a spacer element between said rest surface 12 of the support 8 and said other rib 68. In other words, said valve rests on said support 8 by means of said radial projections 74.

The invention claimed is:

1. A fluid flow valve comprising:

a movable shutter and a body, the body comprising a protruding part that receives said movable shutter, said body being configured to be mounted on a support such that said protruding part is introduced into a housing of said support, said body also being configured to allow fixing of said valve on said support in a direction transverse to a longitudinal extension direction of said protruding part, wherein the valve comprises fixing means for allowing fixing of said body on said support in said transverse direction, wherein said fixing means comprises an orifice arranged in said body in said transverse direction, and wherein said protruding part comprises a first zone intended to be situated in the housing of the support, and a second zone intended to remain outside said housing of the support said fixing means being situated at the level of said second zone.

2. The valve as claimed in claim 1, with a radial tightness between said protruding part and said support.

3. The valve as claimed in claim 2, comprising a seal of the O-ring type, said protruding part and said seal being configured to achieve said radial tightness.

4. The valve as claimed in claim 3, wherein said protruding part comprises a lateral wall with a groove receiving said seal.

5. The valve as claimed in claim 1, wherein said transverse direction is oriented in a plane substantially perpendicular to said longitudinal extension direction.

6. The valve as claimed in claim 1, wherein said transverse direction is oriented tangentially relative to said protruding part.

7. The valve as claimed in claim 1, wherein said body comprises a housing forming a shoulder, and said fixing means are situated between said shoulder and said first zone in the longitudinal extension direction.

8. The valve as claimed in claim 1, wherein said body is configured to allow fixing of said valve projecting from said support.

9. The valve as claimed in claim 1, wherein said body comprises one or more reinforcing ribs.

10. The valve as claimed in claim 9, wherein said rib or ribs are oriented orthogonally to said longitudinal extension direction.

11. The valve as claimed in claim 10, wherein one of said ribs is formed by said shoulder and another of the ribs is formed remote from said shoulder in the longitudinal extension direction.

12. An assembly of a valve as claimed in claim 1 and an engine cylinder head forming said support.

13. The valve as claimed in claim 2, wherein said transverse direction is oriented in a plane substantially perpendicular to said longitudinal extension direction.

14. The valve as claimed in claim 3, wherein said transverse direction is oriented in a plane substantially perpendicular to said longitudinal extension direction.

15. The valve as claimed in claim 4, wherein said transverse direction is oriented in a plane substantially perpendicular to said longitudinal extension direction.

16. The valve as claimed in claim 1, wherein said transverse direction is oriented tangentially relative to said protruding part.

17. The valve as claimed in claim 2, also comprising fixing means allowing fixing of said body on said support in said transverse direction.

18. A fluid flow valve comprising:

a movable shutter and a body, the body comprising a protruding part receiving said movable shutter, said body being configured to be mounted on a support such that said protruding part is introduced into a housing of said support, said body also being configured to allow fixing of said valve on said support in a direction transverse to a longitudinal extension direction of said protruding part, wherein said body is configured to allow fixing of said valve projecting from said support.

19. A fluid flow valve comprising:

a movable shutter and a body, the body comprising a protruding part that receives said movable shutter, said body being configured to be mounted on a support such that said protruding part is introduced into a housing of said support, said body also being configured to allow fixing of said valve on said support in a direction transverse to a longitudinal extension direction of said protruding part, wherein said body comprises one or more reinforcing ribs.

* * * * *